United States Patent [19]

Peters et al.

[11] E Re. 29,341

[45] Reissued Aug. 2, 1977

[54] LOCKING APPARATUS

[76] Inventors: Sherman M. Peters, 5209 S. Vandalia, Apt. 5, Tulsa, Okla. 74135; Lawrence M. Smith, 297 E. Valley Drive NE., Marietta, Ga. 30060

[21] Appl. No.: 595,893

[22] Filed: July 14, 1975

Related U.S. Patent Documents

Reissue of:

[64] Patent No.: 3,794,848
Issued: Feb. 26, 1974
Appl. No.: 256,975
Filed: May 25, 1972

[51] Int. Cl.[2] ..... E05B 49/00

[52] U.S. Cl. ..... 307/129; 70/280; 361/171; 361/182

[58] Field of Search ..... 307/129; 317/134, 138; 70/280; 340/274 R

[56] References Cited

U.S. PATENT DOCUMENTS

| | | | |
|---|---|---|---|
| 3,207,959 | 9/1965 | Miller | 317/138 |
| 3,478,730 | 11/1969 | Bucher | 317/138 |

*Primary Examiner*—Herman Hohauser
*Attorney, Agent, or Firm*—Head, Johnson & Chafin

[57] ABSTRACT

An electronic control actuating system having signal transmitting or injector means and signal receiving means. The signal transmitting means includes a plurality of self-contained oscillator circuits, each oscillator circuit capable of producing an independent radio frequency output signal and wherein the oscillating circuits are adapted to be selectively positioned relative to an actuator means capable of sequentially supplying energy to each of the oscillator circuits for effecting an output of a plurality of sequentially transmitted coded signals. The signal receiving means includes a plurality of self-contained filter circuits, each filter circuit designed for receiving one of the coded radio frequency signals produced by the signal transmitting means, with the signal receiving means including a plurality of sequentially operable switching means, and wherein the filter circuits are adapted to be selectively positioned relative to the sequentially operable switching means for effecting a sequential operation of the switching means to produce an output actuator signal in response to a complete reception of the coded signals produced by the signal transmitting means. Should any signal be received out of sequence, there will be no output signal to the actuator (unlocking-locking unit).

3 Claims, 4 Drawing Figures

101
102
103
104
105
106
112
112L
113
113L
114
115
116
116L
115L
114L
120
121
125
126
127
141
142
143
144
145
146
152
152b
153
153L
154
154L
155
155L
156
156L
157
158
160
171
171a
171b
171c
172
172a
172b
172c
173
173a
173b
173c
174
174a
174b
174c
175
175a
175b
175c
176
176a
176b
176c
176d
176e
181
182
183

LOCKING APPARATUS

Matter enclosed in heavy brackets [ ] appears in the original patent but forms no part of this reissue specification; matter printed in italics indicates the additions made by reissue.

*CROSS-REFERENCE TO RELATED APPLICATION*

*This application is for a re-issue of our Patent No. 3,794,848, issued Feb. 26, 1974, and entitled "Locking Apparatus".*

BACKGROUND OF THE INVENTION

This invention relates to an electronic lock actuating means and is more particularly concerned with a locking means capable of being operated in response to receiving coded radio frequency signals.

Our [expending] *expanding* population and increasing crime necessitates the need for a fool-proof secure locking system.

In the past, most of our locking systems included a locking element selectively movable between a locking and unlocking position by a key. The problem with utilizing a key for operating a lock is that the lock is easily operated by a master key, a copy of the original key, operated by feeler gauging means, or present state of art, electrically actuated locks wherein present surveillance techniques exist to render them unsecure lock systems.

There have been a number of attempts to provide an electronically operable locking means operable in response to receiving an electronic actuator signal. The actuator signal is normally produced by the correct operation of a number of electronic signal actuator elements associated with the locking system. One problem with this type of electronically operable locking means is that the electronic structure and actuating mechanism utilized is often complex, expensive to manufacture and unreliable in performance.

Another problem with the prior art electronically operable locking system was that the system could not be readily programmed to vary the signals required to effect operation of the lock without the service of a skilled electronic technician.

Further, the prior art electronic lock control actuating system does not lend itself to being microminiaturized for lowering the cost and improving the reliability of the locking system.

SUMMARY OF THE INVENTION

The above disadvantages have been overcome by the present invention which basically includes an electronic lock control actuating means operable in response to receiving an actuator signal produced by a signal receiving means. The signal receiving means includes a plurality of self-contained filter circuits, with each filter circuit designed for only receiving one input signal, and wherein the self-contained filter circuits are adapted to be selectively positioned relative to a sequentially operable switching means such that the switching means would be operated in response to a signal produced in a sequential order by each of the filter circuits. The electronic control actuating system includes a signal transmitter or injector means having a plurality of self-contained independent oscillator circuits, with each oscillator circuit capable of producing a coded radio frequency output signal, and wherein the self-contained oscillator circuits are adapted to be selectively positioned relative to a sequentially operable switching means whereby energy can be sequentially transferred to the plurality of oscillating circuits for sequentially producing a plurality of coded radio frequency output signals to be received by the plurality of filter circuits to effect operation of the lock control actuating means.

One important feature of the present invention is that the self-contained independent oscillating circuits and the self-contained independent filter circuits can be selectively positioned relative to each other and relative to its associated sequentially operable switching means for varying the program of coded signals utilized in the electronic control actuating system, with only the correct sequential operation of signals developed by the oscillating circuits being received by the filter circuits for rendering the unlocking apparatus operable.

Another feature of the present invention is that the electrically movable locking element associated with the locking system includes a time control reset means for returning the locking element to an extended locking position after a predetermined period of time in response to operation of the reset means and includes selectively conditionable switch means for automatically moving the locking element to an extended locking position in response to the door being closed.

It is therefore a primary object of the present invention to provide a programmable tone sensitive lock actuating system.

A further object of the present invention is to provide [and] *an* electronic lock control actuating system which lends itself to micro-miniaturization.

An additional object of the present invention is to provide an electronic lock control actuating system which is simple in construction and use, economical to manufacture and reliable in performance.

These and other objects and advantages of the details of construction will become apparent after reading the following description of the illustrative embodiment, with reference to the attached drawings wherein like reference numerals have been used to refer to like parts throughout the several figures, and wherein:

DESCRIPTION OF THE ILLUSTRATIVE EMBODIMENT

Figure 1:
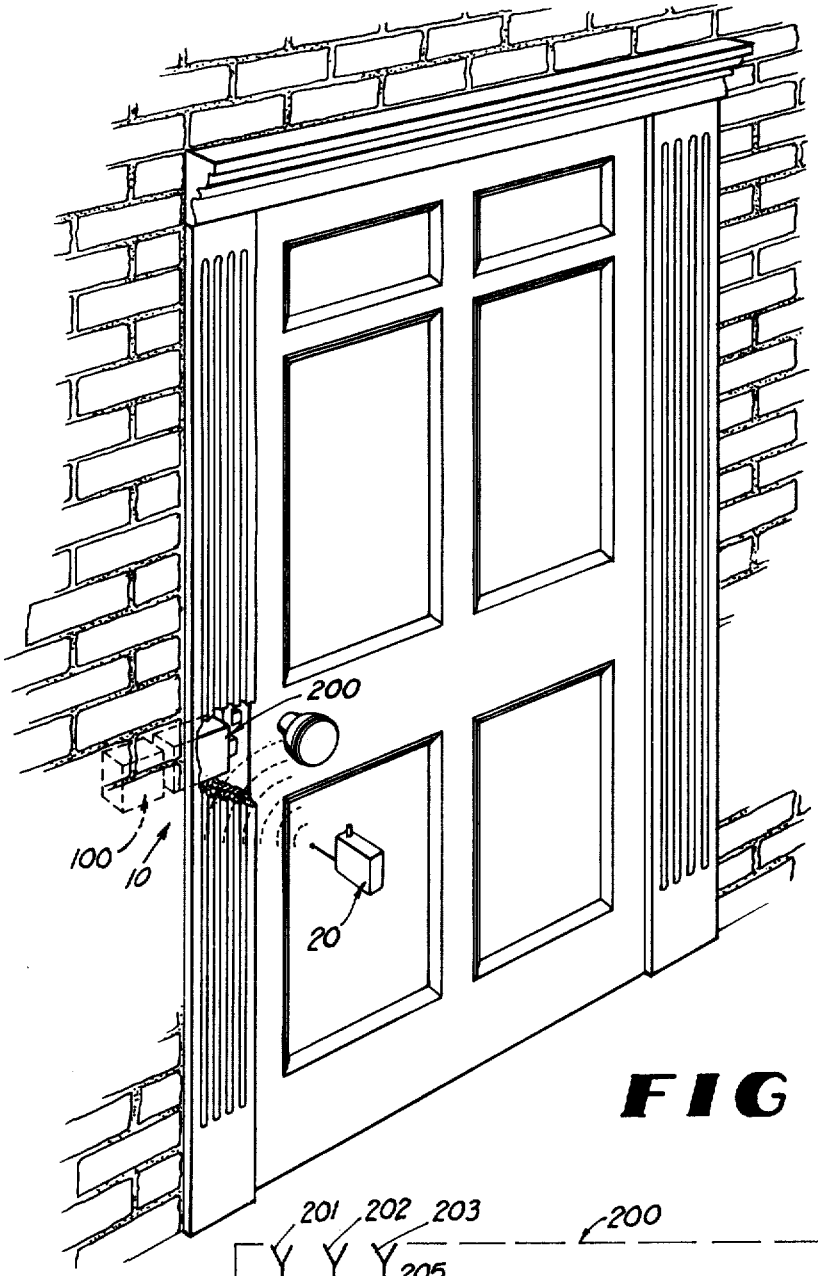
FIG. 1 is a schematic block diagram illustrating the components of an electronic control actuating system embodying the principles of the present invention.

Referring now to the drawing, an electronic control locking system embodying the principles of the present invention is shown in block diagram of FIG. 1 and generally represented by the reference numeral 10. The electronic control locking system will be described with reference to a signal transmitting or injector means 20, a signal receiving means 100 and an electronic control locking apparatus 200.

SIGNAL TRANSMITTING MEANS

Figure 2:
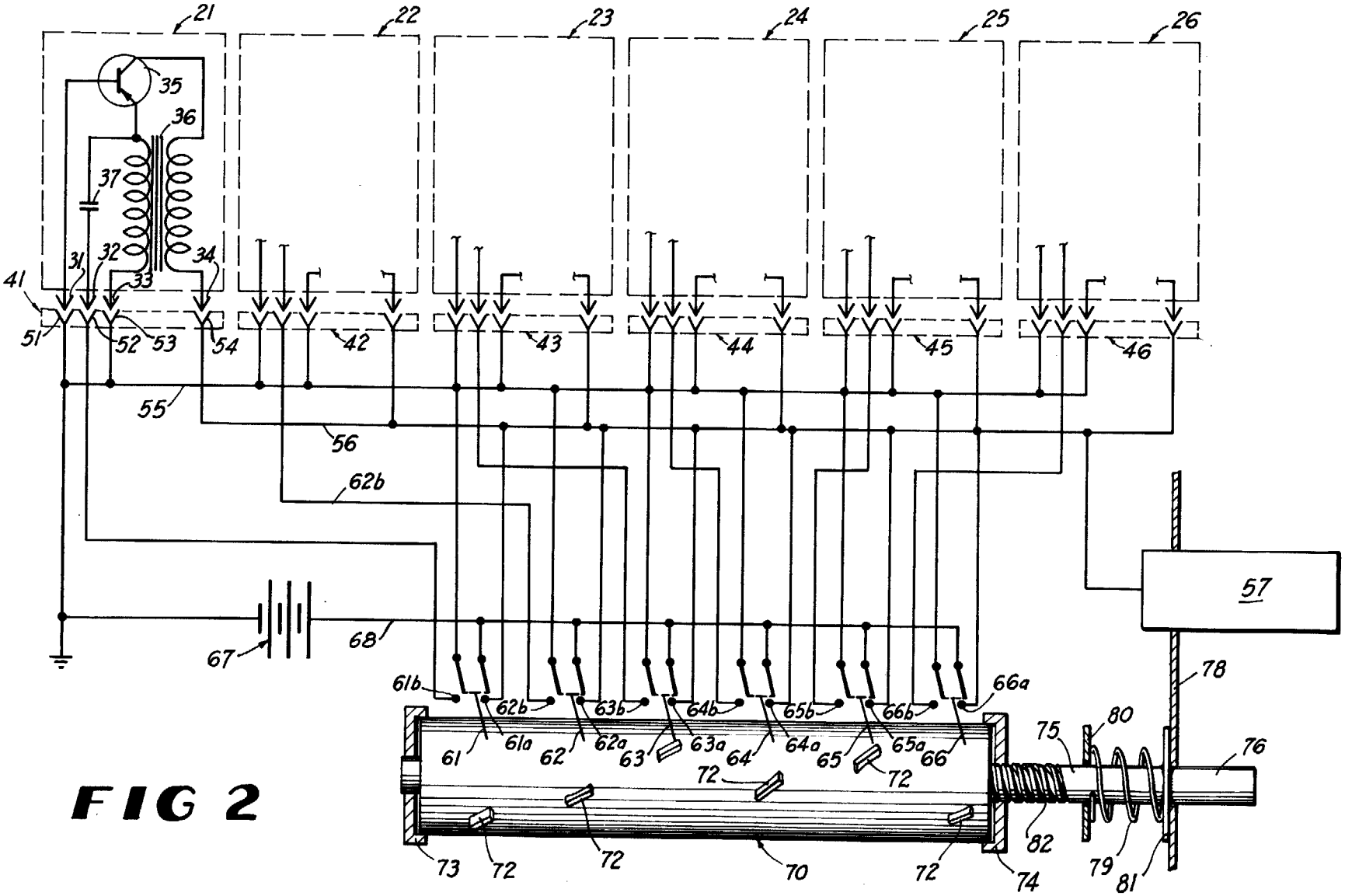
FIG. 2 is an electrical schematic diagram of a tone injector or transmitter utilized in the present invention.

As shown in FIG. 2, the signal transmitting means includes a plurality of self-contained oscillator circuits 21, 22, 23, 24, 25, and 26. Each of the oscillator circuits is constructed or packaged as a self-contained unit having four releasable connector elements 31, 32, 33 and 34. The connector elements 30–34 are adapted to be releasably connected to complementary elements provided on the transmitting device so that the oscillator circuits can be independently removed and the position thereof changed relative to each other such that the sequence of the signal produced by the oscillator circuits can be programmed. Each oscillator circuit is designed to produce a different radio output frequency and includes a transistor 35, transformer 36 and capacitor 37. The capacitor 37 in each of the oscillator circuits is of a different capacity which will operate to produce a different frequency radio signal output from each filter circuit.

As shown in FIG. 2, the signal transmitting means 20 includes a plurality of connector means 41, 42, 43, 44, 45 and 46. Each of the connector means 41–46 includes four releasable connector elements 51, 52, 53 and 54. The releasable connector elements 51–54 are complementary to the oscillator circuit connector elements 31–34 and are adapted to readily receive the oscillator connector elements in electrical conducting relation when inserted therein. The releasable connector elements 51 and 53 are connected to a common ground line 55. Releasable connector elements 54 of each of the oscillator circuits is connected by a common output supply line 56 to the signal transmitter injector probe 57.

As shown in FIG. 2, the signal transmitting means includes a plurality of selectively operable switching elements 61, 62, 63, 64, 65 and 66. The switching elements 61–66 are operatively associated with the connector means 41–46, respectively. Power is supplied from a battery 67 through a common power supply line 68 to each of the switch elements 61–66. The switch elements 61–66 are a double pole switch with one pole of the switch element adapted to electrically connect power supply line 68 and with branch lines 61a, 62a, 63a, 64a, 65a and 66a, respectively, connected to the output supply line 56. The other pole of the double pole switch elements 61–66 are adapted to be electrically connected to connector lines 61b, 62b, 63b, 64b, 65b and 66b, respectively. An opposite end of connector lines 61b–66b are connected to the connector elements 52 in each of the connector means 41–46, respectively.

As shown in FIG. 2, the sequential operation of switches 61–66 is effected by a rotatable actuator drum 70. Rotatable actuator drum 70 is provided with a plurality of camming elements 72, one operatively associated with each of the switch elements 61–66. The camming elements 72 are helically arranged around drum 70 whereby rotation of drum 70 will effect a sequential operation of switches 61–66. Drum 70 is rotatable supported by a pair of support elements 73 and 74. Drum 70 is rotated by an elongated support shaft 75 having an extended key actuating means 76 located externally of the transmitting housing 78. Shaft 75 is spring urged outwardly by a compression spring 79 supported between housing structure 80 and tabs 81 formed on shaft 75. As shown in FIG. 2, shaft 75 includes a spiral groove 82 extending through drum 70. Drum 70 is provided with an inwardly directed projection (not shown) which is complementary to and engages groove 82. A downward depression of key means 76 will effect a one cycle rotation of drum 70 and when the key means 76 is released, compression spring 79 will return the key and shaft outwardly to rotate the actuator drum one revolution in an opposite direction. In operation, when the key operated means 76 is depressed, drum 70 will rotate causing the camming element 72 to effect a sequential closing of switches 61–66. When switches 61–66 are closed, power from battery 67 will be supplied through power supply line 68 through the respective switch elements 61–66 and through connector lines 61a, 61b, respectively, to the associated oscillator circuits 21–26. When a power pulse is transmitted to the oscillator circuits 21–26, a radio frequency output signal will be produced and conducted through releasable connector elements 34, 54 which is transmitted along output supply lines 56 and out through the probe 57.

It is apparent that the oscillator circuits 21–26 can be removed and the arrangement of the oscillator circuits relative to the switching elements 61–66 can be varied to change the program or sequence of signals produced by the oscillator circuits.

SIGNAL RECEIVING MEANS

Figure 3:
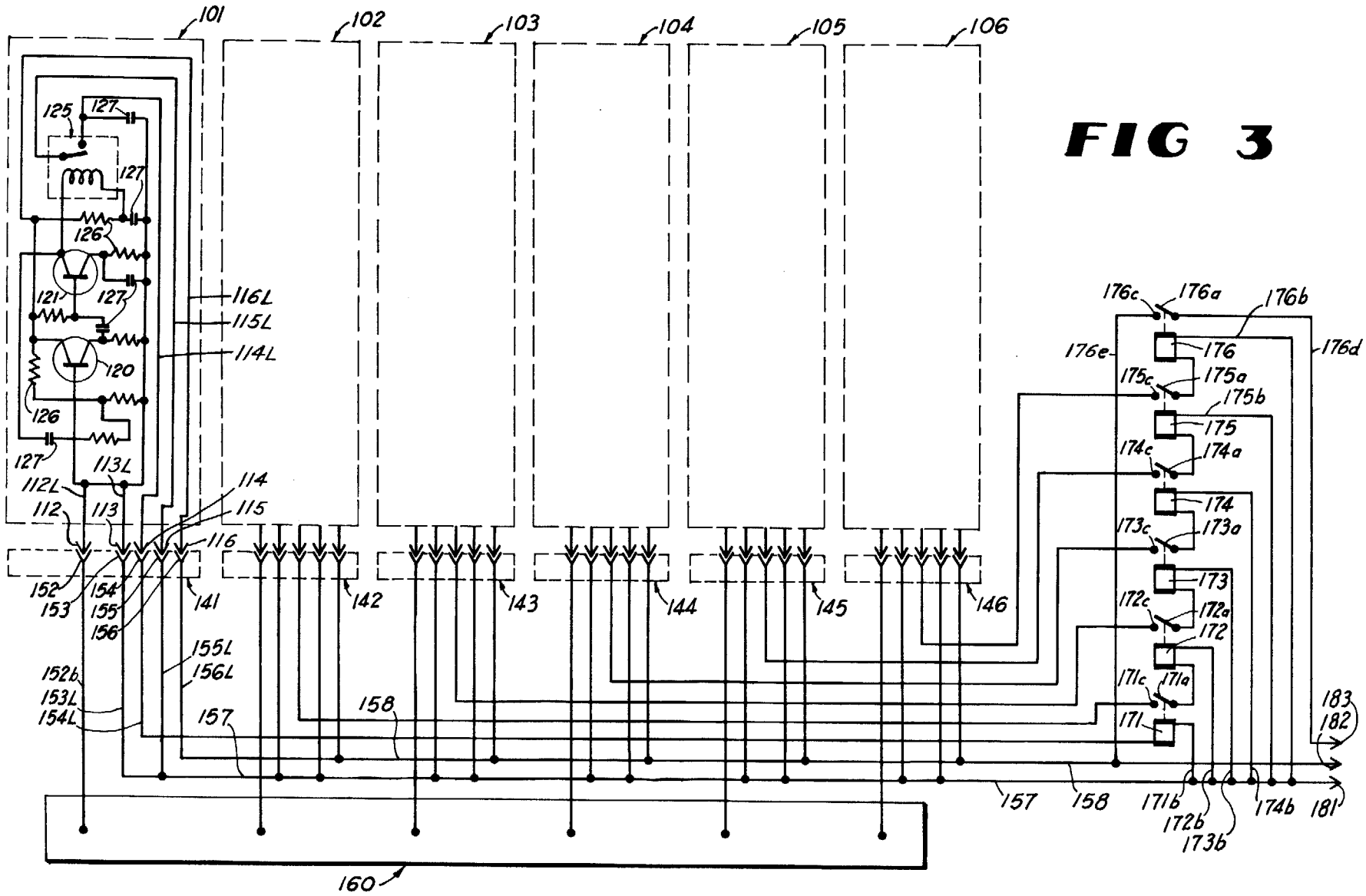
FIG. 3 is an electrical schematic diagram of the filter circuits and sequentially reversible operable switching relay.

As shown in FIG. 3, the signal receiving means includes a plurality of receiving elements 101, 102, 103, 104, 105 and 106. Each of the receiving elements includes a filter circuit constructed in a self-contained package means and is provided with a plurality of releasable connector elements 112, 113, 114, 115 and 116. Since each of the filter circuits 101–106 are identical in construction with only the size of the resistors and capacity of the capacitors being changed, only the details of filter circuit 101 is illustrated. Each of connector elements 112–116 are connected through respective connector lines 112L, 113L, 114L, 115L and 116L. The connector lines 112L–116L are operatively connected to a pair of transistors 120, 121 and to a toned resonant frequency reed relay 125. Each circuit includes a plurality of resistors generally represented by the reference numeral 126 and a plurality of capacitors represented by the reference numeral 127. Each filter circuit is designed to receive and be operated by only one radio tone frequency and when that tone frequency is received, the circuit is operable to develop an output signal through line 114L for operating a sequential latching relay system to be described below.

As shown in FIG. 3, the signal receiving means includes a plurality of connector means 141, 142, 143, 144, 145 and 146. Each of the connector means 141–146 includes a plurality of releasable connector elements 152, 153, 154, 155 and 156. The releasable connector elements 152–156 are complementary to releasable connector elements 112–116 and are adapted to be interconnected therewith in an assembled relationship whereby electrical current can flow through the connector elements.

The releasable connector elements 153 and 155 are connected by lines 153L, 155L, respectively, to a common ground line 157. Releasable connector element 152 is connected by a line 152b to a copper bus bar 160. The copper bus bar 160 serves as an antenna to receive signals transmitted from the transmitter 20 and the signals are transmitted through connecting lines 152b to the releasable connector elements 152 for transmitting the signal into the filter circuits 101–106. Each of the connector elements 156 is connected by branch line 156L to a common power supply line 158.

As shown in FIG. 3, the signal receiving means includes a plurality of relay elements 171, 172, 173, 174, 175 and 176. Each relay element 171–176 is operatively associated with a switch 171a–176a, respectively. Each of the relay elements 171–176 are connected by branch connecting lines 171b–176b, respectively, to the common ground line 157. An input pulse is transmitted to relay 171 through a branch connecting line 154L. Branch connecting line 154L is operatively connected through releasable connector elements 114 and 154 to the power output line 114L of filter circuit 101. The power output lines 114L associated with filter circuits 102–106 are connected through branch connecting lines 154L to switch terminals 171c, 172c, 173c, 174c, 175c and 176c. When a power pulse is transmitted from filter 101, relay 171 will be energized thereby closing switch element 171a. When switch element 171a is closed, a power pulse received from filter 102 will be transmitted through the terminal 171c and switch 171a to relay 172, thereby energizing relay 172. When relay 172 is energized, a power pulse transmitted from filter circuit 103 will be transmitted through switch terminal 172c, switch 172a to relay 173 thereby energizing relay 173. When relay 173 is energized, a power pulse transmitted from filter circuit 104 will be transmitted through terminal 173c, switch 173a to relay 174 to thereby energize relay 174. When relay 174 is energized, a power pulse transmitted from filter circuit 105 will be transmitted through terminal 174c, switch 174a to energize relay 175. When relay 175 is energized, a power output signal from filter circuit 106 will be transmitted through terminal 175c, switch 175a to energize relay 176.

Switching terminal 176c operatively associated with switch 176a is operatively connected by a connecting line 176e to the power supply line 158. Therefore, when the relays 171–176 are closed in sequence as described above, a pulse will be transmitted through power supply line 158, branch connecting line 176e, terminal 176c, switch element 176a and out through an output line 176d. As shown in FIG. 3, the common ground line 157 is connected to a releasable connector element 181, power supply line 158 is connected to a releasable connector element 182 and signal output line 176d is connected to a releasable connector element 183.

In operation, the filter circuits 101–106 are programmed in connected relationsip relative to the switching relay elements 171–176 such that the sequential signals transmitted from the signal transmitter will effect a sequential closing of switches 171a–176a as described above. When the switches are sequentially closed by receiving a correct sequence of tones transmitted from the transmitter 20, switch 176a will close thereby conducting an actuator signal out through line 176d and releasable connector element 183. The copper bus bar 160 is common to each of the filter circuits and will serve as an antenna to pick up the tone transmitted from the transmitter and for transmitting the tone through branch connecting lines 152L for input into the filter circuits 101–106.

ELECTRONIC CONTROL LOCKING APPARATUS

Figure 4:
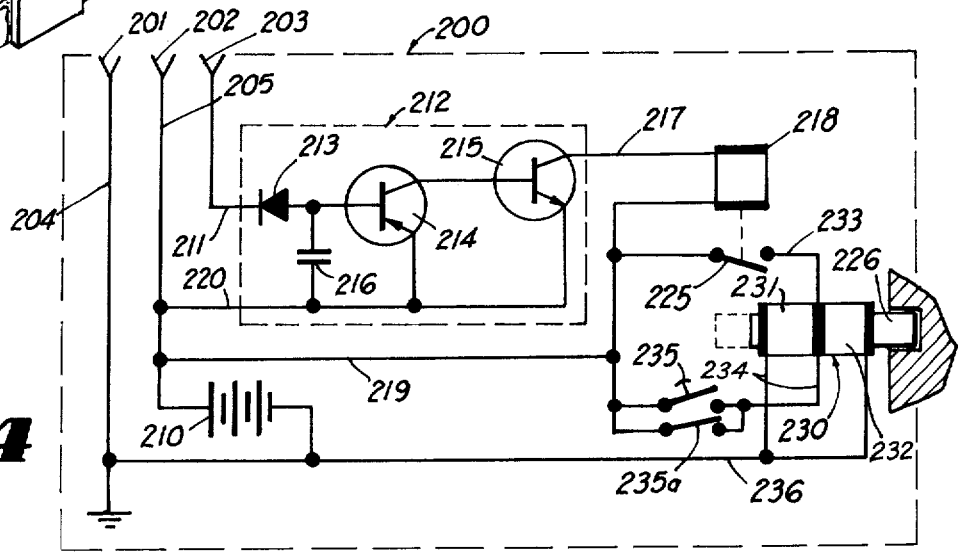
FIG. 4 is an electrical schematic diagram showing the actuating circuit used for effecting movement of the locking element between locked and unlocked positions.

The signal receiving releasable connector elements 181–183 are adapted to be releasable connected with complementary connector elements 201, 202, 203, respectively provided on the electronic control locking apparatus 200, as shown in FIG. 4. Releasable connector element 201 is connected to a common ground line 204. Releasable connector element 202 is connected by line 205 to the positive terminal of a battery supply means 210. Releasable connector element 203 is connected by a signal transmitting line 211 to a transistorized amplifying circuit means 212. The transistorized amplifying circuit includes a diode 213, transistor 214, transistor 215 and capacitor 216. The transistorized circuit 212 is connected by a signal supply line 217 to a relay 218. Relay 218 is connected by line 219 to the positive terminal of battery 210. An output from the transistorized circuit 212 is connected by line 220 to the line 204. Relay 218 is operable when energized for closing switch 225.

As shown in FIG. 4, the locking apparatus includes a dead bolt locking element 226 which is slidably supported by a double-coil polarized solenoid 230. Solenoid 230 includes first and second coils 231, 232. Coil 231 is connected by line 233 through switch means 225 to the power supply line 219. Coil 232 is connected by connecting line 234 to the common ground line 204. An actuator signal from signal receiving means 100 is transmitted through the transistorized circuit 212 and amplified to effect energization of relay 218 to close switch 225 thereby allowing power to be conducted through coil 231. When coil 231 is energized, the dead bolt latch 226 will be retracted to an unlocked position, as shown in dash line of FIG. 4.

The second coil 232 of the double coil solenoid 230 is operable for returning the dead bolt latch outwardly to a locked position and is operatively connected through a timing reset switch 235 to the positive power line 219. Coil 232 is connected by line 236 to the common ground line 204. Switch 235 is time controlled and is operable when manually moved to a closed position for closing and conducting a current to solenoid 232 after being closed for a predetermined period of time, which time would be sufficient to permit an individual located within the house to press the reset switch 235, move to a location outside of the house and pull the door to a closed position, after which the timing switch would operate to energize solenoid 232 for moving dead bolt latch 226 outwardly to a locked position.

A by-pass switch 235a is connected around timing reset switch 235 so that solenoid 232 can be immediately energized for moving the locking element to an extended locked position.

Additional by-pass switch means (not shown) could be operatively associated with the door so that the locking element would be immediately moved to the locking position in response to closing the door.

OPERATION

In utilizing the electronic control locking apparatus of the present invention, the oscillator circuits 21–26 and filter circuits 101–106 are programmed so that the sequence of tone signals generated by the oscillating circuits 21–26 will be sequentially received in order by the filter circuits 101–106. With a person located externally of a house, the signal transmitter is operated to permit a sequence of tone signals to effect operation of the lock by depressing the key means 76, thereby rotating actuator drum 70. When actuator drum 70 is rotated, switches 61–66 will be sequentially closed, thereby sequentially transmitting power pulses to each of the oscillator circuits 21–26. As each of the oscillator circuits 21–26 receives a power pulse, the power pulse will develop an output radio frequency tone signal which is transmitted through line 56 and out through transmitting probe 57. The sequential tone signals transmitted through tone probe 57 will then be sequentially picked up by the common bus bar antenna 160, with the signals being transmitted sequentially to the respective filter elements 101–106. As the filter elements 101–106 sequentially receive the generated tones, an output signal will be supplied from each of the filter circuits through branch connecting lines 154L to the switching relay means 171–176 to effect a sequential closing of switches 171a–176a. After a sequential closing of switches 171a–176a, an actuator pulse is then transferred from the power supply line 158 through switch 176a and out through signal actuator line 176d. The pulse transmitted through signal actuator line 176d will then be transferred through line 211 of the locking apparatus and into the transistorized circuit 212. The signal will be amplified in the transistorized circuit 212 and will effect operation of relay 218. When relay 218 is energized to close switch 225, a pulse will be transmitted through coil 231 to cause the dead bolt latch to be withdrawn to a retracted, unlocked position, thus permitting the door or other associated structure to be readily opened. When it is desired to move the dead bolt latch 226 to an extended locking position, the manually controlled reset timing switch 235 is operated and a predetermined period of time after switch 235 is operated, a reset pulse will be transmitted to coil 232 to cause the latching element to be moved outwardy to an extended locked position and/or for instant locking operation to by-pass the time delay switch 235 or 235a or by a door operated by-pass switch.

It is apparent that a number of solid state circuit systems and/or integrated circuit systems can be substituted for the above described oscillator filter circuits and can be operated sequentially in a manner as described above to effect a locking and unlocking operation of an electronic controlled locking apparatus.

It now becomes apparent that the above described illustrative embodiment of an electronic control locking apparatus is capable of obtaining the above stated objects and advantages. It is obvious that those skilled in the art may make modification in the details of construction without departing from the spirit of the invention which is to be limited only by the scope of the appended claims.

What is claimed is:

1. An electronic control actuating system comprising in combination:

a. signal transmitting means including

*(1)* a plurality of signal transmitting elements comprising self-contained oscillator circuits with each signal transmitting oscillator circuit operable for producing a different radio frequency output signal [;].

*(2)* actuator means operable for sequentially supplying energy to each of said oscillator circuits for sequentially producing a plurality of coded radio frequency output signals [and with said actuator means comprising a rotatable drum having a set of camming elements;]. [and]

*(3)* means for selectively relocating said signal transmitting elements relative to said actuator means including a plurality of sets of releasable connectors with the relative spacing and orientation of the releasable connection of each set being substantially identical.

*(4)* a plurality of switches located adjacent said [rotatable drum in operative association with said camming means,] *actuator means* and

*(5)* a plurality of [conductor] *conductors* coupling said switches with said releasable connectors whereby said coded output signal produced by said signal transmitting means can be selectively [programmed] *reprogrammed* for changing the sequence of said coded output signals; and b. signal receiving means operatively associated with said signal transmitting means for sequentially receiving only said plurality of coded output signals produced by said signal transmitting means and including

*(1)* a plurality of signal receiving elements, each signal receiving element operable for receiving one of said plurality of coded output signals and wherein said signal receiving elements are selectively [programmable] *reprogrammable to respond to* [so that said signal receiving elements can be altered in response to changing of said] *a programmed sequence* coded output signal *of said transmitter,* and

*(2)* means for producing an actuator signal in response to and only when a complete reception of said coded signals are received *from said transmitter* in a programmed sequential manner.

2. An electronic control actuating system as defined in claim 1 further characterized in that said signal receiving means includes a plurality of self-contained filter circuits, each filter circuit being operable for receiving one of said coded radio frequency output signals produced by said signal transmitting means, and wherein said signal receiving means includes a plurality of sequentially operable switching means capable of producing an actuator signal when sequentially operated, and wherein said self-contained filter circuits are adapted to be selectively positioned relative to said sequentially operable switching means for effecting operation of said switching means in response to sequentially receiving said plurality of coded sequentially produced radio frequency output signals produced by said signal transmitting means.

*3. An electronic actuated lock, comprising:*

*a portable transmitter having an energy source therein, the transmitter having a plurality of oscillator positions;*

*a plurality of self-contained oscillator circuits each providing, when energized, a different selected frequency output, each oscillator circuit being connectable into a said oscillator position;*

*means in said transmitter for sequentially energizing said oscillator circuits, each oscillator circuit being energized for a preselected time for providing an output signal, the transmitter output thereby being in the form of a series of different signals, the sequence of signals being selectable by positioning of said oscillator circuits;*

*a lock operable when electrically energized;*

*a receiver having a plurality of receiver output positions and having a receiver relay connected to each of said positions;*

*a plurality of self-contained receiver circuits, each receiver circuit being responsive to the output frequency of one of said oscillator circuits, each receiver circuit being connectable into a receiver position;*

*circuit means connecting said receiver relays in series arrangement whereby the actuation of said receiver relays in series connects said voltage source to said lock to operate the same, whereby said lock is operated only when said oscillator circuit positions and said receiver circuit positions are preselectedly arranged in a corresponding sequence.*

* * * * *